(12) United States Patent
Omori et al.

(10) Patent No.: US 12,030,343 B2
(45) Date of Patent: Jul. 9, 2024

(54) TIRE

(71) Applicant: Sumitomo Rubber Industries, Ltd., Kobe (JP)

(72) Inventors: Chisato Omori, Kobe (JP); Takuya Osawa, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/886,488

(22) Filed: Aug. 12, 2022

(65) Prior Publication Data

US 2023/0081835 A1 Mar. 16, 2023

(30) Foreign Application Priority Data

Aug. 25, 2021 (JP) ................. 2021-136952

(51) Int. Cl.
*B60C 9/18* (2006.01)
*B60C 9/02* (2006.01)
*B60C 11/00* (2006.01)

(52) U.S. Cl.
CPC ............ *B60C 11/005* (2013.01); *B60C 9/023* (2013.01); *B60C 9/18* (2013.01); *B60C 2011/0033* (2013.01)

(58) Field of Classification Search
CPC ....... B60C 9/18; B60C 9/1835; B60C 11/005; B60C 11/0008
See application file for complete search history.

(56) References Cited

U.S. PATENT DOCUMENTS

| 10,239,351 | B2 | 3/2019 | Oba et al. | |
| 2015/0007916 | A1* | 1/2015 | Oba ...................... | B60C 11/005 |
| | | | | 152/209.5 |
| 2022/0063341 | A1* | 3/2022 | Tomomatsu ........ | B60C 11/0058 |
| 2022/0203771 | A1* | 6/2022 | Kikuchi ............. | B60C 11/0083 |

FOREIGN PATENT DOCUMENTS

| JP | 2002-160508 A | 6/2002 |
| JP | 2013-169882 A | 9/2013 |
| JP | 2018108792 A * | 7/2018 |

* cited by examiner

*Primary Examiner* — Cedrick S Williams
(74) *Attorney, Agent, or Firm* — XSENSUS LLP (57) ABSTRACT

A tread of a tire can include a cap layer and a base layer. A loss tangent of the cap layer at 30° C. may be not greater than 0.30, and a loss tangent of the base layer at 30° C. may be less than the loss tangent of the cap layer at 30° C. The base layer can be inward of a reference end of the tread in an axial direction A fixing layer can be between the cap layer and a carcass in a radial direction. A first end of the fixing layer can be outward of an end of the base layer in the axial direction, or a position of the first end of the fixing layer can coincide with a position of the end of the base layer in the axial direction. Adhesiveness of the fixing layer can be higher than adhesiveness of the cap layer.

17 Claims, 5 Drawing Sheets

TIRE

CROSS-REFERENCE TO RELATED APPLICATION

The present application claims priority to Japanese patent application JP 2021-136952, filed on Aug. 25, 2021, the entire content of which is incorporated herein by reference in its entirety.

BACKGROUND

Technical Field

The present disclosure relates to a tire.

Background Art

A tread includes a cap layer coming into contact with a road surface, and a base layer disposed inwardly of the cap layer in the radial direction. Grip force and wear resistance are taken into consideration for rubber used in the cap layer. A low-heat-generation property is taken into consideration for rubber used in the base layer.

In production of a tire, multiple components such as the cap layer and the base layer are combined to prepare a green tire (also referred to as raw cover). The green tire is pressurized and heated in a mold to obtain a tire.

As a method for shaping tire components, for example, a strip-wind method has been known. In this method, a strip formed of uncrosslinked rubber is wound to form a laminate having a desired shape (for example, Japanese Laid-Open Patent Publication No. 2002-160508).

Tires may be required to reduce rolling resistance from an environmental viewpoint. Therefore, rubber used in the cap layer is examined so as to have a low-heat-generation property such that the cap layer can also contribute to reduction of rolling resistance.

Rubber having a low-heat-generation property may be inferior in adhesiveness to rubber having a greater heat generation property. In a portion corresponding to a tire shoulder portion, the cap layer is likely to be separated from a carcass. In a case where the cap layer has been separated from the carcass, air may be left in a green tire. In a case where air is left, bareness or the like may be caused. Therefore, it is considered that sheets having high adhesiveness are disposed between the cap layer and the base layer and between the cap layer and the carcass, to join the cap layer, the base layer, and the carcass to each other.

In order to further reduce rolling resistance, it is also considered that a thickness of a tread may be reduced to reduce a volume of the tread. In the tread, the base layer is entirely covered by the cap layer. By using a thin tread, the cap layer covering the base layer also becomes thin. The thickness of the tread is reduced toward the outer side in the axial direction. Therefore, in a case where the above-described separation preventing technique using the adhesive sheet is applied to the tire, it may be difficult to sufficiently ensure the thickness of the cap layer in the shoulder portion.

In limit run (for example, in the case of high-speed cornering of a vehicle), the shoulder portion can also come into contact with a road surface. A thin cap layer may not be able to sufficiently inhibit progress of wear, and the base layer may be exposed. The base layer may be more brittle than the cap layer, so that exposure of the base layer may cause separation of the tread.

In a case where separation of the cap layer from the carcass in a green tire can be prevented while the thickness of the cap layer is ensured in the shoulder portion, rolling resistance can be expected to be reduced while wear resistance is ensured in limit run.

SUMMARY

A tire according to one aspect of the present disclosure can include: a tread; a pair of sidewalls inward of the tread in a radial direction so as to be continuous with ends of the tread; a pair of beads inward of the sidewalls in the radial direction; a carcass inward of the tread and the pair of sidewalls so as to extend on and between one of the beads and another of the beads; a belt between the tread and the carcass in the radial direction, the belt including multiple belt cords aligned with each other; an inner liner inward of the carcass; and a pair of fixing layers spaced from each other in an axial direction. The tread can have a circumferential groove formed therein, and a groove depth of the circumferential groove may be not greater than 7.0 mm. The tread can include a cap layer and a base layer covered by the cap layer. A loss tangent of the cap layer at 30° C. may be not greater than 0.30, and a loss tangent of the base layer at 30° C. may be less than the loss tangent of the cap layer at 30° C. The base layer can be inward of a reference end of the tread in the axial direction. Each fixing layer can be between the cap layer and the carcass in the radial direction. A first end of the fixing layer can be outward of an end of the base layer in the axial direction, or a position of the first end of the fixing layer can coincide with a position of the end of the base layer in the axial direction. Adhesiveness of each fixing layer can be higher than adhesiveness of the cap layer.

DETAILED DESCRIPTION

The present disclosure will be described below in detail based on preferred embodiments with appropriate reference to the drawings.

The present disclosure has been made in view of such circumstances in the background, and an object of the present disclosure, among one or more objects, can be to provide a tire that can reduce rolling resistance while ensuring wear resistance in limit run.

In the present disclosure, a state where a tire is mounted on a normal rim, an internal pressure of the tire is adjusted to a normal internal pressure, and no load is applied to the tire, can be referred to or characterized as normal state.

In the present disclosure, unless otherwise specified, dimensions and angles of components of the tire are measured in the normal state. In a case where dimensions and angles of components on a meridian cross-section of a tire cannot be measured in a state where the tire is mounted on a normal rim, the dimensions and angles are measured by conforming a distance between left and right beads to a distance between beads of a tire mounted on a normal rim, on a cross-section of the tire which is obtained by cutting the tire along a plane including a rotation axis.

The normal rim can represent a rim defined by a standard on which the tire is based. Examples of the normal rim include the "standard rim" in the JATMA standard, the "Design Rim" in the TRA standard, and the "Measuring Rim" in the ETRTO standard.

The normal internal pressure can represent an internal pressure defined by a standard on which the tire is based. Examples of the normal internal pressure include the "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard.

The normal load can represent a load defined by a standard on which the tire is based. Examples of the normal load include the "maximum load capacity" in the JATMA standard, the "maximum value" recited in "TIRE LOAD LIMITS AT VARIOUS COLD INFLATION PRESSURES" in the TRA standard, and the "LOAD CAPACITY" in the ETRTO standard.

In the present disclosure, a green tire can refer to or be characterized as an uncrosslinked tire. The green tire may also be referred to as raw cover. The uncrosslinked state may also referred to as unvulcanized state.

In the present disclosure, the crosslinked rubber can refer to a molded product, of a rubber composition, obtained by pressurizing and heating the rubber composition. The rubber composition can be uncrosslinked rubber obtained by mixing base rubber and chemicals as components of the rubber composition in a kneading machine such as a Banbury mixer. The crosslinked rubber may also be referred to as vulcanized rubber, and the rubber composition may also be referred to as uncrosslinked rubber or unvulcanized rubber.

Examples of the base rubber include natural rubber (NR), butadiene rubber (BR), styrene-butadiene rubber (SBR), isoprene rubber (IR), ethylene-propylene rubber (EPDM), chloroprene rubber (CR), acrylonitrile butadiene rubber (NBR), and isobutylene-isoprene-rubber (IIR). Examples of the chemicals include a reinforcing agent such as carbon black and silica, a plasticizer such as aromatic oil, a filler such as zinc oxide, a lubricant such as stearic acid, an antioxidant, a processing aid, a tackifier, sulfur, and a vulcanization accelerator. Selection of the base rubber and the chemicals, contents of the selected chemicals, and the like can be determined as appropriate according to the specifications of the component, such as a tread and sidewalls, to which the rubber composition is applied.

In the present disclosure, a loss tangent (also referred to as tanδ), at a temperature of 30° C., of a component formed of the crosslinked rubber among components of the tire can be measured by using a viscoelasticity spectrometer ("VES" manufactured by Iwamoto Seisakusho), for instance, under the following conditions in accordance with the standard of JIS K6394.

Initial strain=10%
Dynamic strain=2%
Frequency=10 Hz
Deformation mode=tension

In this measurement, a test piece can be sampled from the tire. In a case where a test piece cannot be sampled from the tire, a test piece can be sampled from sheet-shaped crosslinked rubber (hereinafter, also referred to as rubber sheet) obtained by pressurizing and heating a rubber composition used for forming a component to be measured, for instance, at a temperature of 170° C., for 12 minutes.

In the present disclosure, a Mooney viscosity (ML 1+4) of the rubber composition for a component formed of crosslinked rubber among components of the tire, can be measured, for instance, at a temperature condition of 100° C. in accordance with a Mooney viscosity measurement method based on the standard of JIS K 6300-1.

In the present disclosure, adhesiveness of a component formed of crosslinked rubber among the components of the tire can be represented by adhesiveness, of a rubber composition for the component, which can be measured by using a PICMA Tack Tester manufactured by Toyo Seiki Seisakusho, Ltd., for instance, under the following conditions, in accordance with the standard of JIS T 9233.

Sticking load: 4.9 N
Separating speed: 30 mm/min
Sticking time: 2.5 seconds
Reference sample dimensions: 12.7 mm×152 mm
Temperature: 23° C.
Humidity: 55%

Figure 1:
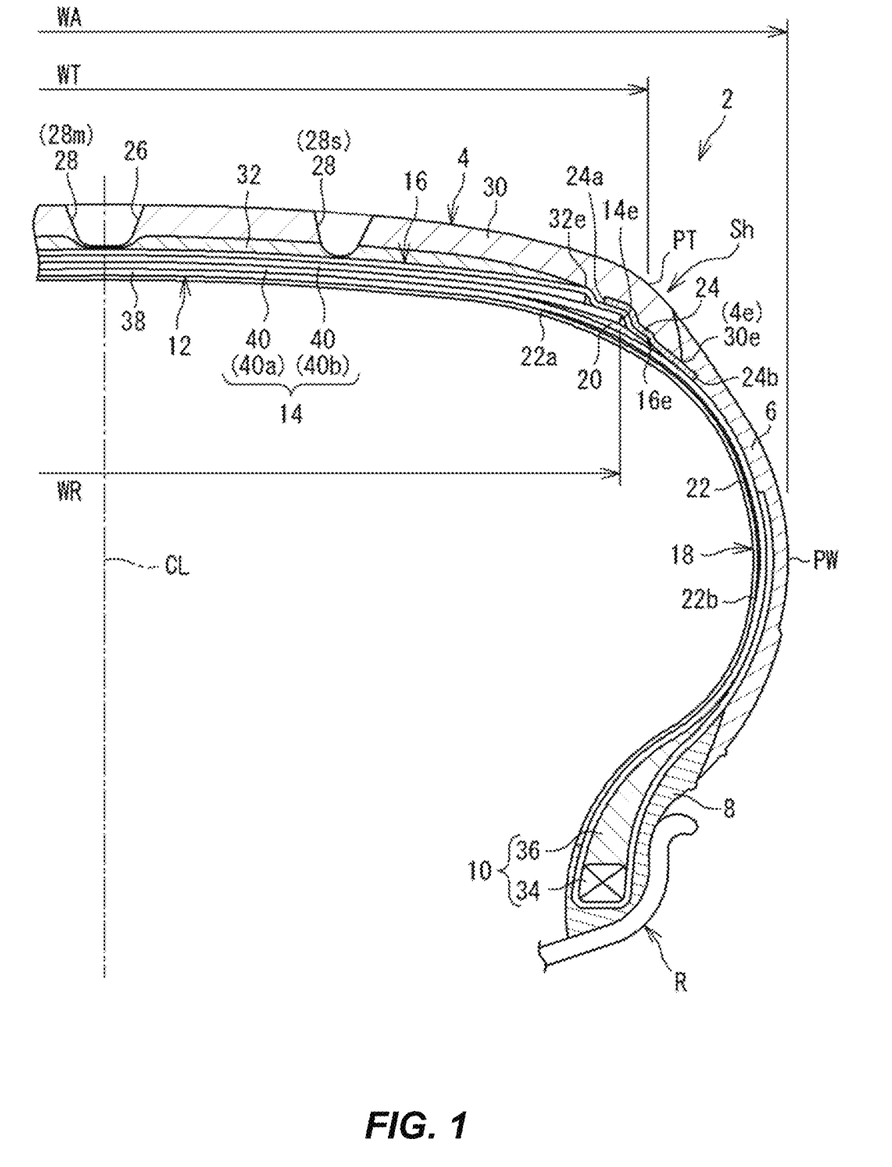
FIG. 1 is a cross-sectional view of a part of a tire according to one embodiment of the present disclosure.

FIG. 1 shows a part of a tire 2 according to one embodiment of the present disclosure. The tire 2 can be for a passenger car. In FIG. 1, the tire 2 can be mounted on a rim R. The rim R can be a normal rim. The inside of the tire 2 can be filled with air, and an internal pressure of the tire 2 can be adjusted. The tire 2 shown in FIG. 1 is in a normal state.

The tire 2 mounted on the rim R may also be referred to as tire-rim complex. The tire-rim complex can include the rim R and the tire 2 mounted on the rim R.

FIG. 1 shows a part of a cross-section (hereinafter, also referred to as meridian cross-section) of the tire 2 along a plane including a rotation axis of the tire 2. In FIG. 1, the left-right direction represents the axial direction of the tire 2, and the up-down direction can represent the radial direction of the tire 2. The direction perpendicular to the surface of the drawing sheet in FIG. 1 can represent the circumferential direction of the tire 2. In FIG. 1, an alternate long and short dash line CL can represent the equator plane of the tire 2.

In FIG. 1, a position represented by reference character PW can be an outer end, in the axial direction, of the tire 2. In a case where a decorative portion such as a pattern or a character is on the outer surface, the outer end PW can be specified based on an imaginary outer surface obtained on the assumption that no decorative portion is provided.

In FIG. 1, a length represented by reference character WA can be the maximum width of the tire 2, that is, the cross-sectional width (see JATMA and the like). The cross-sectional width WA can represent a distance in the axial direction from one of the outer ends PW to the other of the outer ends PW. The outer end PW can be a position (hereinafter, referred to as the maximum width position) at which the tire 2 has the maximum width.

The tire 2 can include a tread 4, a pair of sidewalls 6, a pair of clinches 8, a pair of beads 10, a carcass 12, a belt 14, a band 16, an inner liner 18, a pair of cushions 20, a pair of insulations 22, and a pair of fixing layers 24.

The tread 4 can come into contact with a road surface at the outer surface. The tread 4 can have grooves 26 formed therein. Thus, a tread pattern can be formed.

The grooves 26 can include a circumferential groove 28, which can extend continuously, for instance, in the circumferential direction. In the tire 2, a plurality of the circumferential grooves 28 can be formed in the tread 4 so as to be aligned in the axial direction. In the tire 2 shown in FIG. 1, three circumferential grooves 28 can be formed in the tread 4.

Among the three circumferential grooves 28, the circumferential grooves 28 on the outer side in the axial direction can be referred to or characterized as shoulder circumferential grooves 28s. The circumferential groove 28 inward of the shoulder circumferential grooves 28s in the axial direction can be referred to or characterized as a middle circumferential groove 28m. In the tire 2, the middle circumferential groove 28m can be on the equator plane.

In the tire 2, a groove depth of the circumferential groove 28 may be not greater than 7.0 mm. In other words, each of the circumferential grooves 28 formed in the tread 4 can have a groove depth of not greater than 7.0 mm. In general, a groove depth of a circumferential groove may be greater than 7.0 mm. Therefore, the circumferential groove 28 of the tire 2 can be relatively shallow.

By adopting the relatively shallow circumferential groove 28, the tread 4 having a small thickness can be adopted. By adopting the tread 4 having a small thickness, the volume of the tread 4 can be reduced. The tread 4 can contribute to reduction of rolling resistance. The lower limit of the groove depth can be determined as appropriate in consideration of drainage performance or wear resistance.

In the tire 2, the arrangement of the circumferential grooves 28 formed in the tread 4 and the groove widths thereof are not particularly limited. The arrangement and the groove widths can be determined as appropriate in consideration of the specifications of the tire 2.

The tread 4 can include a cap layer 30 and a base layer 32.

The cap layer 30 can form the outer surface of the tread 4. The cap layer 30 can be formed of crosslinked rubber obtained in consideration of wear resistance and grip performance.

A loss tangent (hereinafter, referred to as loss tangent of the cap layer 30) of the cap layer 30 at 30° C. may be not greater than 0.30. For the cap layer 30, a low-heat-generation property as well as wear resistance and grip performance can be taken into consideration. The cap layer 30 can contribute to reduction of rolling resistance. From this viewpoint, the loss tangent of the cap layer 30 can be not greater than 0.21.

The base layer 32 can be inward of the cap layer 30 in the radial direction. An end 32e of the base layer 32 can be inward of an end 30e of the cap layer 30 in the axial direction. In the tire 2, the end 30e of the cap layer 30 can be the end of the tread 4.

The base layer 32 can be covered by the cap layer 30. For instance, the base layer 32 can directly cover (i.e., be in direct contact with) the cap layer 30. Specifically, the entirety of the base layer 32 can be covered by the cap layer 30 from the outer side in the radial direction. The base layer 32 thus does not come into contact with a road surface until the tread 4 is worn and the base layer 32 is exposed. Unlike the cap layer 30, wear resistance and grip performance may not be taken into consideration for the base layer 32.

The base layer 32 can be formed of crosslinked rubber having a low-heat-generation property. A loss tangent (hereinafter, referred to as loss tangent of the base layer 32) of the base layer 32 at 30° C. may be less than the loss tangent of the cap layer 30. The base layer 32 can contribute to reduction of rolling resistance. From this viewpoint, the loss tangent of the base layer 32 may be not greater than 0.11, for instance, not greater than 0.10.

The base layer 32 of the tire 2 can be formed of one component. Alternatively, the base layer 32 may be formed of two or more components spaced from each other in the axial direction.

In the tire 2, when adhesiveness of the base layer 32 is 100, adhesiveness of the cap layer 30 can be, for instance, not less than 56 and not greater than 91. The cap layer 30 can have adhesiveness that is less than the adhesiveness of the base layer 32.

Each sidewall 6 can be continuous with an end 4e of the tread 4. The sidewall 6 can be inward of the tread 4 in the radial direction. The sidewall 6 can extend from the end 4e of the tread 4 toward the clinch 8 along the carcass 12. The sidewall 6 can be formed of crosslinked rubber obtained in consideration of cut resistance.

Each clinch 8 can be inward of the sidewall 6 in the radial direction. The clinch 8 can come into contact with the rim R. The clinch 8 can be formed of crosslinked rubber obtained in consideration of wear resistance.

Each bead 10 can be inward of the clinch 8 in the axial direction. The bead 10 can be inward of the sidewall 6 in the radial direction. The bead 10 can include a core 34 and an apex 36. The core 34 can include a steel wire, for instance. The apex 36 can be outward of the core 34 in the radial direction. The apex 36 can be tapered outwardly. The apex 36 can be formed of crosslinked rubber having high stiffness.

The carcass 12 can be inward of the tread 4, the pair of sidewalls 6, and the pair of clinches 8. The carcass 12 can extend on and between one of the beads 10 and the other of the beads 10. The carcass 12 can have a radial structure.

The carcass 12 can include at least one carcass ply 38. From the viewpoint of reduction of rolling resistance, the carcass 12 can be formed of one carcass ply 38, for instance. In the tire 2, the carcass 12 can be formed of one carcass ply 38. The carcass ply 38 can be turned up around each bead 10 from the inner side toward the outer side in the axial direction.

The carcass ply 38 can include multiple carcass cords aligned with each other. The carcass cords can be covered by topping rubber. Each carcass cord can intersect the equator plane. The carcass cord can be formed of an organic fiber. Examples of the organic fiber include nylon fibers, rayon fibers, polyester fibers, and aramid fibers.

The belt 14 can be between the tread 4 and the carcass 12 in the radial direction. The belt 14 can be layered on the carcass 12.

In FIG. 1, a length represented by reference character WR can be an axial width of the belt 14. The axial width WR can represent a distance in the axial direction from one of the ends of the belt 14 to the other of the ends of the belt 14. In the tire 2, the axial width WR of the belt 14 may be, for instance, not less than 65% of the cross-sectional width WA and not greater than 85% thereof.

The belt 14 can be formed of at least two layers 40 layered in the radial direction. In the tire 2, the belt 14 can be formed of two layers 40 layered in the radial direction. In the two layers 40, the layer 40 on the inner side is an inner layer 40a, and the layer 40 on the outer side is an outer layer 40b. As shown in FIG. 1, the inner layer 40a can have a width greater than the outer layer 40b. A length from the end of the outer layer 40b to the end of the inner layer 40a may be not less than 3 mm and not greater than 10 mm.

Each of the inner layer 40a and the outer layer 40b can include multiple belt cords aligned with each other, which are not shown. The belt cords can be covered by topping rubber. Each belt cord can be inclined relative to the equator plane. The material of the belt cord can be steel, for instance.

The band 16 can be between the tread 4 and the belt 14 in the radial direction. The band 16 can be layered on the belt 14.

The band 16 can include a helically wound band cord. The band cord can be covered by topping rubber. The band cord can extend substantially in the circumferential direction. Specifically, an angle of the band cord relative to the circumferential direction may be not greater than 5°, for instance. The band 16 can have a jointless structure. In the tire 2, a cord formed of an organic fiber may be used as the band cord. Examples of the organic fiber include nylon fibers, rayon fibers, polyester fibers, and aramid fibers.

An end 16*e* of the band 16 can be outward of an end 14*e* of the belt 14 in the axial direction. A length from the end of the belt 14 to the end of the band 16 may be not less than 3 mm and not greater than 7 mm. The band 16 can hold the ends 14*e* of the belt 14.

In the tire 2, the band 16 can be a full band in which both the ends oppose each other across the equator plane. The band 16 can covers the belt 14. Specifically, the band 16 can cover the entirety of the belt 14 from the outer side in the radial direction. The band 16 can hold the entirety of the belt 14. In the tire 2, deformation of the ground contact surface can be reduced.

According to one or more embodiments, the band 16 may be implemented by a pair of edge bands spaced from each other in the axial direction for covering the end 14*e* portions of the belt 14. In this case, the band 16 can contribute to reduction of the weight of the tire 2.

In order to enhance stiffness of the tread 4, the band 16 may be formed of a full band and a pair of edge bands.

The inner liner 18 can be inward of the carcass 12. The inner liner 18 can form the inner surface of the tire 2. The inner liner 18 can be formed of crosslinked rubber having a low gas permeation coefficient. The inner liner 18 can maintain internal pressure of the tire 2.

The cushions 20 can be spaced from each other in the axial direction. The cushion 20 can be between the carcass 12 and the ends of the belt 14 and the band 16. The cushion 20 can be formed of crosslinked rubber having low stiffness. The cushion 20 may be optional depending on the specifications of the tire 2.

Each insulation 22 can be between the carcass 12 and the inner liner 18. One end (hereinafter, referred to as first end 22*a*) of the insulation 22 can be inward of the end 14*e* of the belt 14 in the axial direction. The other end (hereinafter, referred to as second end 22*b*) of the insulation 22 can be outward of the bead 10 and inward of the maximum width position PW in the radial direction. The insulation 22 can be formed of crosslinked rubber obtained in consideration of adhesiveness.

In the tire 2, the inner liner 18 can be joined to the carcass 12 through the insulation 22 in a portion in which the insulation 22 is disposed. In a portion in which the insulation 22 is not disposed, such as a portion between the first end 22*a* of one of the insulations 22 and the first end 22*a* of the other of the insulations 22, and portions located inwardly of the second ends 22*b* of the insulations 22, the inner liner 18 can be joined directly to the carcass 12. The entirety of the inner liner 18 may be joined to the carcass 12 through the insulation 22.

The fixing layers 24 can be spaced from each other in the axial direction. The fixing layers 24 can be in shoulder portions Sh of the tire 2. The shoulder portion Sh can refer to a portion from a portion near the end 14*e* of the belt 14 to a portion near the end 4*e* of the tread 4.

The fixing layer 24 can be formed of crosslinked rubber obtained in consideration of adhesiveness.

Figure 2:
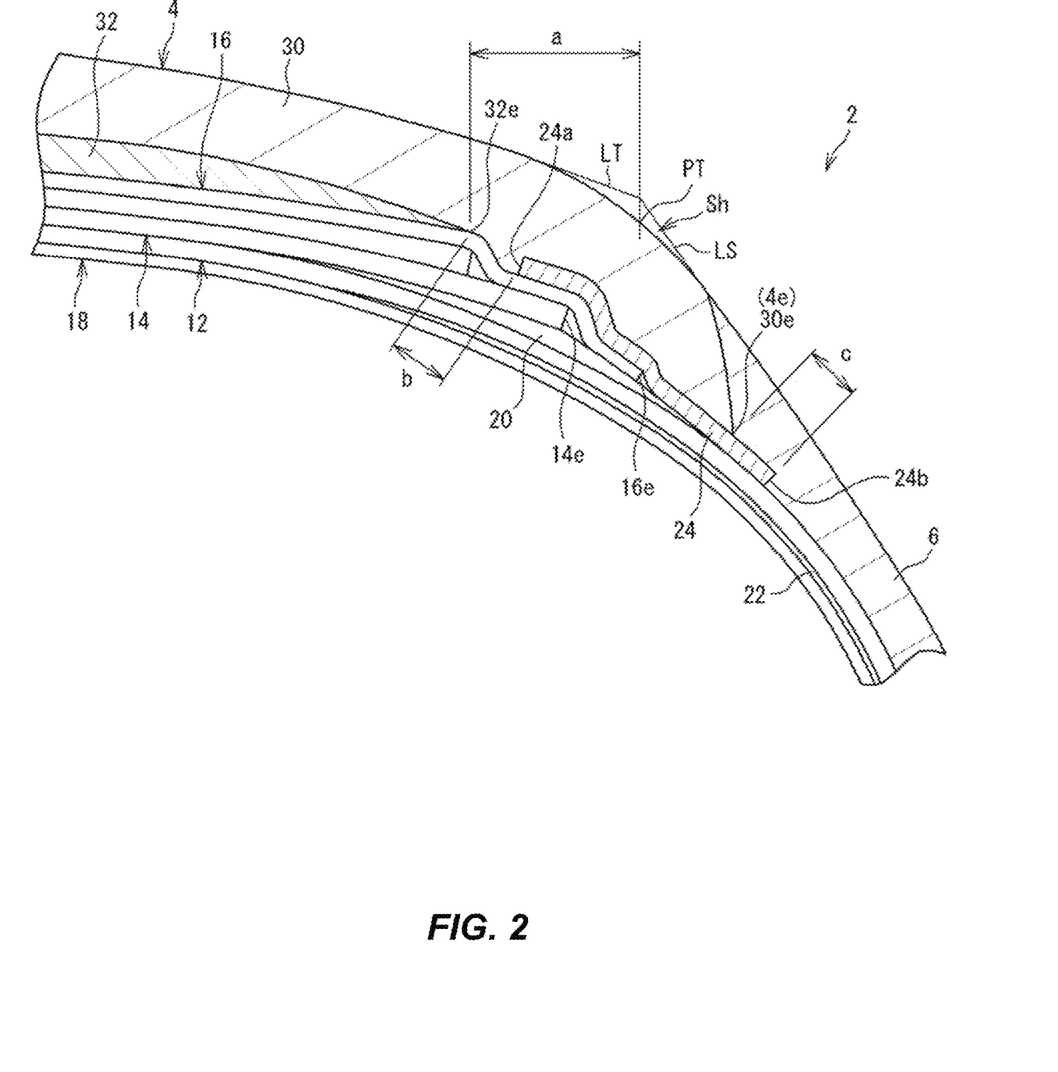
FIG. 2 is an enlarged cross-sectional view of a shoulder portion of the part of the tire of FIG. 1.

FIG. 2 shows a part of the cross-section of the tire 2 shown in FIG. 1. FIG. 2 shows the shoulder portion Sh of the tire 2.

A first end 24*a* of the fixing layer 24 can be inward of the end 16*e* of the band 16 in the axial direction. The first end 24*a* of the fixing layer 24 can be layered on the band 16 and covered by the cap layer 30.

A second end 24*b* of the fixing layer 24 can be outward of the end 16*e* of the band 16 in the axial direction. The fixing layer 24 can cover the end 16*e* of the band 16. A portion, of the fixing layer 24, located outwardly of the end 16*e* of the band 16 can be layered on the optional cushion 20 and the carcass 12. The second end 24*b* of the fixing layer 24 can be layered on the carcass 12.

The second end 24*b* of the fixing layer 24 can be outward of the end 4*e* of the tread 4 in the axial direction. The second end 24*b* of the fixing layer 24 can be between the carcass 12 and the sidewall 6. The cap layer 30 can be layered on a portion, of the fixing layer 24, located inwardly of the end 4*e* of the tread 4. The second end 24*b* of the fixing layer 24 may be disposed inwardly of the end 4*e* of the tread 4 in the axial direction.

Figure 3:
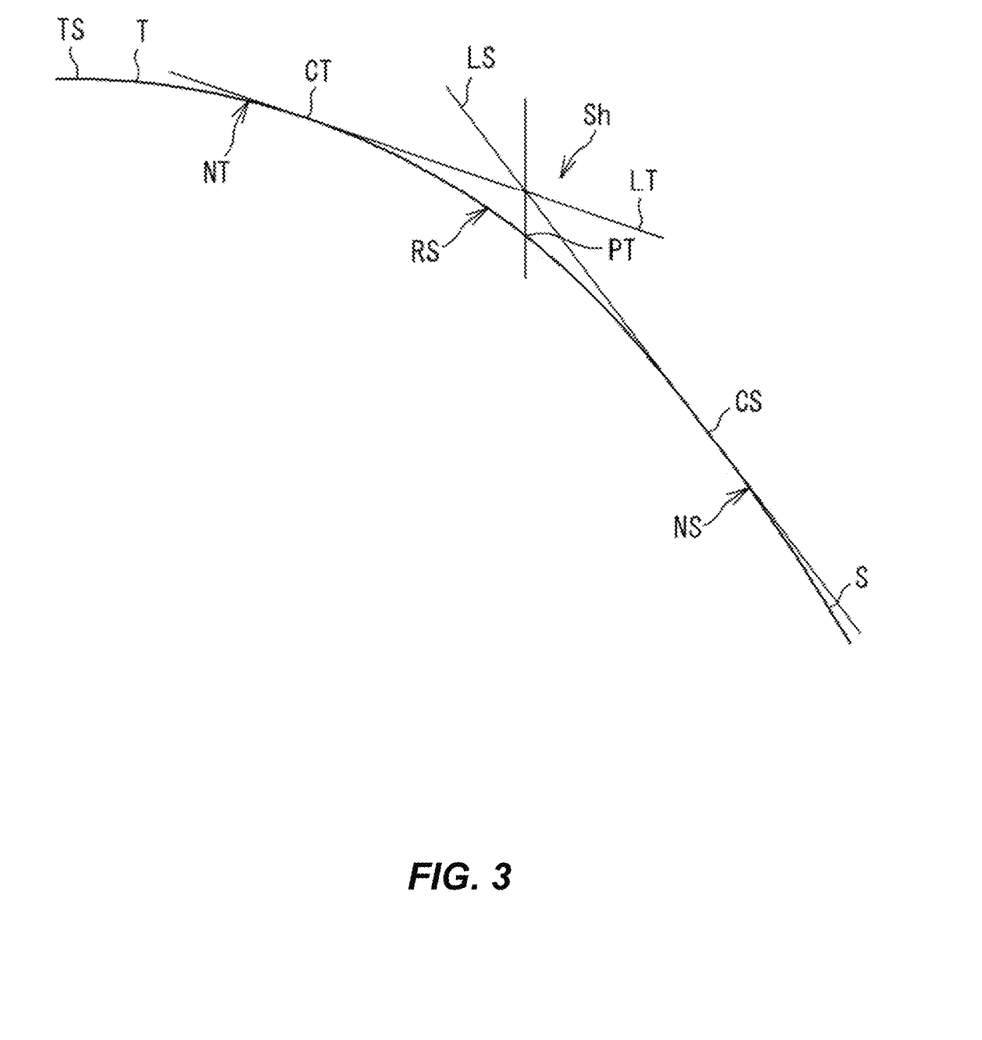
FIG. 3 is an enlarged cross-sectional view of a contour of the shoulder portion of FIG. 2.

FIG. 3 shows a contour of the shoulder portion Sh of the tire 2 on the meridian cross-section. The contour shown in FIG. 3 can be obtained by measuring the outer surface shape of the tire 2 in the normal state by a displacement sensor.

On the meridian cross-section, the contour of the outer surface (hereinafter, referred to as tire outer surface TS) of the tire 2 can be formed by connecting a plurality of contour lines each formed as a straight line or an arc. In the present disclosure, the contour line formed as a straight line or an arc can be simply referred to as a contour line. The contour line formed as the straight line can be referred to as a straight contour line, and the contour line formed as an arc can be referred to as a curved contour line.

The tire outer surface TS can include a tread surface T and a pair of side surfaces S continuous with the ends of the tread surface T. On the meridian cross-section, the contour of the tread surface T can include a plurality of curved contour lines having different radii. In the tire 2, in the plurality of curved contour lines included in the contour of the tread surface T, a curved contour line having the smallest radius can be at the end portion of the tread surface T and can be connected to the side surface S. On the meridian cross-section, the contour of the tire outer surface TS can include, on each end portion of the tread surface T, a curved line portion that can be a curved contour line connected to the side surface S and formed as an arc having the smallest radius among the plurality of curved contour lines included in the contour of the tread surface T. In FIG. 3, the curved line portion can be represented by reference character RS.

On the contour of the tire outer surface TS, the curved line portion RS can be in contact with a contour line (hereinafter, referred to as inner adjacent contour line NT) adjacent to the curve line portion RS on the inner side in the axial direction, at a contact point CT. The curved line portion RS can be in contact with a contour line (hereinafter, referred to as outer adjacent contour line NS), forming a contour of the side surface S, adjacent to the curve line portion RS on the outer side in the axial direction, at a contact point CS. The contour of the tire outer surface TS can include the inner adjacent contour line NT that can be inward of the curved line portion RS in the axial direction and can be in contact with the curved line portion RS, and the outer adjacent contour line NS that can be outward of the curved line portion RS in the axial direction and can be in contact with the curved line portion RS.

In FIG. 3, a solid line LT can be a line tangent to the curved line portion RS at the contact point CT at which the inner adjacent contour line NT and the curved line portion RS are in contact with each other. A solid line LS can be a line tangent to the curved line portion RS at the contact point CS at which the outer adjacent contour line NS and the curved line portion RS can be in contact with each other. A position represented by reference character PT can be an intersection point of the tread surface T and a straight line extending in the radial direction through an intersection point of the tangent line LT and the tangent line LS. In the tire 2, the intersection point PT can represent a tread reference end. The tread reference end PT can be a position, on the tread surface T, corresponding to an intersection point of the tangent line LT and the tangent line LS.

In FIG. 1, a length represented by a double-headed arrow WT can be a tread width. The tread width WT can represent a distance in the axial direction from one of the tread reference ends PT to the other of the tread reference ends PT. In the tire 2, a ratio (WT/WA) of the tread width WT to the cross-sectional width WA may be not less than 70% and not greater than 90%.

In the tire 2, the end 14e of the belt 14 can be outward of the tread reference end PT in the axial direction. The position of the end 16e of the band 16 can substantially coincide with the position of the tread reference end PT in the axial direction. The end 4e of the tread 4 can be outward of the tread reference end PT in the axial direction.

The tire 2 can be obtained by pressurizing and heating a green tire in a mold. For producing the tire 2, a green tire can be prepared. When the green tire is prepared, for example, an uncrosslinked base layer can be formed by shaping a rubber composition for the base layer 32 into a desired shape. An uncrosslinked cap layer can be formed by shaping a rubber composition for the cap layer 30 into a desired shape. The uncrosslinked components such as the uncrosslinked base layer and the uncrosslinked cap layer can be combined to obtain the green tire. For combining the uncrosslinked components, adhesiveness of the uncrosslinked components can be utilized.

Rubber having a relatively low-heat-generation property may be inferior in adhesiveness to rubber having a relatively greater heat generation property. As described above, for the cap layer 30 of the tire 2, a low-heat-generation property can be taken into consideration. The adhesiveness of the cap layer 30 can be relatively low, and the carcass 12 can be greatly bent in a portion corresponding to the shoulder portion Sh of the tire 2, so that an uncrosslinked cap layer may be separated from an uncrosslinked carcass. In a case where the uncrosslinked cap layer is separated from the uncrosslinked carcass, air may be left in the green tire.

If air is left, bareness and the like may be caused. Therefore, it is considered that the fixing layer 24 having high adhesiveness can be between the cap layer 30 and the base layer 32 and between the cap layer 30 and the carcass 12 to prevent separation of the uncrosslinked cap layer from the uncrosslinked carcass in the green tire.

As described above, from the viewpoint of reduction of rolling resistance, the tread 4 having a small thickness can be adopted for the tire 2. The cap layer 30 covering the base layer 32 can also have a smaller thickness as compared with a conventional cap layer. Therefore, if the above-described technique for preventing separation of the uncrosslinked cap layer from the uncrosslinked carcass is applied, the thickness of the cap layer 30 may not be able to be sufficiently ensured in the shoulder portion Sh. Therefore, in limit run in which the shoulder portion Sh comes into contact with a road surface, the base layer 32 may be exposed. The base layer 32 may be more brittle than the cap layer 30, so that, if the base layer 32 is exposed, separation of the tread 4 may be caused.

Although the base layer may be covered by the cap layer also in a conventional tire, the end of the base layer may be outward of the tread reference end in the axial direction. Meanwhile, in the tire 2 according to one or more embodiments of the present disclosure, the end 32e of the base layer 32 can be inward of the tread reference end PT in the axial direction. In other words, the base layer 32 can be inward of the tread reference end PT in the axial direction.

In the tire 2, the cap layer 30 of the shoulder portion Sh can have a thickness greater than that of a cap layer of a shoulder portion in a conventional tire. In the shoulder portion Sh, the cap layer 30 can be formed so as to have a sufficient thickness between the tire outer surface TS and the base layer 32. In limit run in which the shoulder portion Sh can come into contact with a road surface, exposure of the base layer 32 can be prevented.

In the tire 2, wear resistance can be ensured in limit run.

In the tire 2, the base layer 32 can have a volume less than that of a base layer of a conventional tire. Therefore, rolling resistance may be increased.

However, as described above, the tread 4 of the tire 2 may be thin. Although the volume of the base layer 32 can be less than that of a conventional tire, the tire 2 can achieve reduction of rolling resistance.

Figure 4:
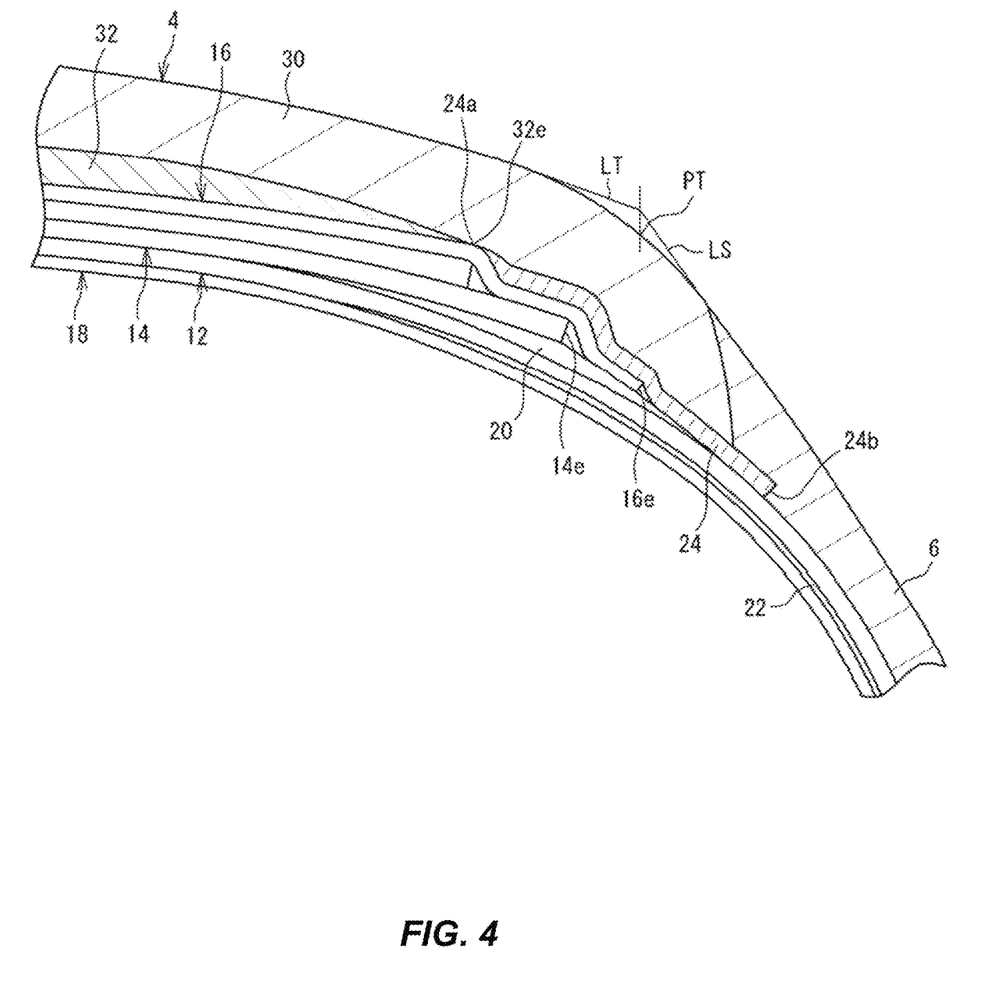
FIG. 4 is an enlarged cross-sectional view of a shoulder portion according to a modification.

Furthermore, in the tire 2, the fixing layer 24 can be between the cap layer 30 and the carcass 12 in the radial direction. According to one or more embodiments, the fixing layer 24 can be in direct contact with each of the cap layer 30 and the carcass 12. That is, for at least a portion, no other elements or components may be between the cap tread 30 and the carcass 12 other than the fixing layer 24. The first end 24a of the fixing layer 24 can be of the end 32e of the base layer 32 in the axial direction. As shown in FIG. 4, the position of the first end 24a of the fixing layer 24 may coincide with the position of the end 32e of the base layer 32 in the axial direction.

In the tire 2, adhesiveness of the fixing layer 24 can be higher than adhesiveness of the cap layer 30.

In production of the tire 2, the uncrosslinked cap layer can sufficiently adhere to the uncrosslinked carcass through an uncrosslinked fixing layer. Separation of the uncrosslinked cap layer from the uncrosslinked carcass can be prevented, whereby air can be prevented from being left in the green tire.

In production of the tire 2, the tire 2 having high quality can be stably produced. In other words, the tire 2 that can achieve reduction of rolling resistance while ensuring wear resistance in limit run can be stably produced.

In FIG. 2, a length represented by reference character a can be a distance from the tread reference end PT to the end 32e of the base layer 32. The distance a can be represented by a distance in the axial direction. In a case where the end 32e of the base layer 32 is outward of the tread reference end PT in the axial direction, the distance a can be represented by a negative value.

In the tire 2, the distance a from the tread reference end PT to the end 32e of the base layer 32 may be not less than 5 mm and not greater than 15 mm.

In a case where the distance a is set to be not less than 5 mm, the thickness of the cap layer 30 can be ensured in the shoulder portion Sh. In the tire 2, exposure of the base layer 32 can be prevented in limit run. From this viewpoint, the distance a can be not less than 7 mm, for instance, not less than 9 mm.

In a case where the distance a is set to be not greater than 15 mm, a volume of the base layer 32 can be ensured. In the tire 2, the base layer 32 can effectively contribute to reduction of rolling resistance. From this viewpoint, the distance a may be not greater than 13 mm, for instance, not greater than 11 mm.

In FIG. 2, a length represented by reference character b can be a distance from the first end 24a of the fixing layer 24 to the end 32e of the base layer 32. The distance b can be represented by the shortest distance. In a case where the first end 24a of the fixing layer 24 is inward of the end 32e of the base layer 32 in the axial direction, the distance b can be represented by a negative value.

In the tire 2, the distance b from the first end 24a of the fixing layer 24 to the end 32e of the base layer 32 may be not greater than 5 mm.

In a case where the distance b is set to be not greater than 5 mm, the fixing layer 24 can be structured to have an appropriate size. The fixing layer 24 having such a structure can effectively contribute to prevention of separation of the cap layer 30 from the carcass 12 in the shoulder portion Sh. From this viewpoint, the distance b may be not greater than 3 mm, for instance, not greater than 1 mm.

In a case where the first end 24a of the fixing layer 24 is inward of the end 32e of the base layer 32 in the axial direction, the cap layer 30 having a small thickness can be formed in a portion in which the fixing layer 24 overlaps the base layer 32, and a volume of the fixing layer 24 can be increased. The cap layer 30 having a small thickness may reduce wear resistance in limit run, and the fixing layer 24 having a great volume may increase rolling resistance. From the viewpoint of stably producing the tire 2 that can achieve reduction of rolling resistance while ensuring wear resistance in limit run, the position of the first end of the fixing layer 24 can coincide with the position of the end of the base layer 32 in the axial direction as shown in FIG. 4.

In FIG. 2, a length represented by reference character c can be a distance from the end 30e of the cap layer 30 to the second end 24b of the fixing layer 24. The distance c can be represented by the shortest distance. The distance c can be represented by a positive value in a case where the second end 24b of the fixing layer 24 is outward of the end 30e of the cap layer 30 in the axial direction, as shown in FIG. 2. The distance c can be represented by a negative value in a case where the second end 24b of the fixing layer 24 is inward of the end 30e of the cap layer 30 in the axial direction.

In the tire 2, the second end 24b of the fixing layer 24 can be in a zone from a position distant from the end 30e of the cap layer 30 over 5 mm in the inward direction to a position distant from the end 30e over 10 mm in the outward direction, for instance. In other words, the distance c from the end 30e of the cap layer 30 to the second end 24b of the fixing layer 24 may be not less than −5 mm and not greater than 10 mm.

In a case where the distance c is set to be not less than −5 mm, the fixing layer 24 can be structured to have an appropriate size. Separation of the uncrosslinked cap layer from the uncrosslinked carcass in the shoulder portion Sh can be prevented, whereby the tire 2 can be stably produced. From this viewpoint, the distance c may be not less than 0 mm. In other words, the position of the second end 24b of the fixing layer 24 may coincide with the position of the end 30e of the cap layer 30 in the axial direction, or the second end 24b of the fixing layer 24 may be outward of the end 30e of the cap layer 30 in the axial direction.

In a case where the distance c is set to be not greater than 10 mm, a volume of the fixing layer 24 can be appropriately maintained. In the tire 2, increase of rolling resistance due to the fixing layer 24 can be inhibited. From this viewpoint, the distance c may be not greater than 5 mm.

In the tire 2, the fixing layer 24 can be structured to have a constant thickness. The thickness of the fixing layer 24 may be not less than 0.5 mm and not greater than 2.0 mm, for instance.

In a case where the thickness is set to be not less than 0.5 mm, stiffness of the fixing layer 24 can be appropriately maintained in an uncrosslinked state. The uncrosslinked fixing layer can effectively contribute to prevention of separation of the uncrosslinked cap layer from the uncrosslinked carcass. From this viewpoint, the thickness of the fixing layer 24 may be not less than 1.0 mm.

In a case where the thickness is set to be not greater than 2.0 mm, increase of rolling resistance due to the fixing layer 24 can be inhibited. From this viewpoint, the thickness may be not greater than 1.5 mm.

In the tire 2, a Mooney viscosity (ML 1+4) of a rubber composition for the fixing layer 24 may be not less than 45 and not greater than 80, for instance.

In a case where the Mooney viscosity (ML 1+4) is set to be not less than 45, stiffness of the fixing layer 24 can be appropriately maintained in the uncrosslinked state. The uncrosslinked fixing layer can effectively contribute to prevention of separation of the uncrosslinked cap layer from the uncrosslinked carcass. From this viewpoint, the Mooney viscosity (ML 1+4) may be not less than 60.

In a case where the Mooney viscosity (ML 1+4) is set to be not greater than 80, good adhesiveness of the fixing layer 24 can be maintained. Also in this case, the uncrosslinked fixing layer can effectively contribute to prevention of separation of the uncrosslinked cap layer from the uncrosslinked carcass.

As described above, in the tire 2, adhesiveness of the fixing layer 24 can be higher than adhesiveness of the cap layer 30. Specifically, a ratio of the adhesiveness of the fixing layer 24 to the adhesiveness of the cap layer 30 may be not less than 1.30. Thus, the uncrosslinked fixing layer can effectively contribute to prevention of separation of the uncrosslinked cap layer from the uncrosslinked carcass. From this viewpoint, the ratio may be not less than 1.50. Optionally, the greater the ratio is, the better the effect may be. Therefore, an upper limit of the ratio may not be set.

In the tire 2, the fixing layer 24 can also be joined to the carcass 12. From the viewpoint of effectively preventing separation of the uncrosslinked cap layer from uncrosslinked carcass, the fixing layer 24 can have adhesiveness higher than adhesiveness of the topping rubber of the carcass 12. Specifically, a ratio of the adhesiveness of the fixing layer 24 to the adhesiveness of the topping rubber may be not less than 1.10, such as not less than 1.20. Optionally, the greater the ratio is, the better the effect may be. Therefore, an upper limit of the ratio may not be set.

As described above, according to the present disclosure, the tire 2 that can achieve reduction of rolling resistance while ensuring wear resistance in limit run can be obtained.

EXAMPLES

Although the present disclosure will be described below in more detail by means of examples and the like, the present disclosure is not limited to these examples.

Example 1

Pneumatic tires (tire size=205/55R16 91V), for a passenger car, having the fundamental structure shown in FIG. 1 and specifications indicated below in Table 1 were obtained.

The distance a from the reference end PT of the tread to the end of the base layer was 10 mm. The distance b from the first end of the fixing layer to the end of the base layer was 0 mm. As shown in FIG. 4, the position of the first end of the fixing layer was caused to coincide with the position of the end of the base layer in the axial direction. The distance c from the end of the cap layer to the second end of the fixing layer was 5 mm.

In Example 1, the groove depth of the middle circumferential groove was 6.7 mm. The loss tangent of the cap layer at 30° C. was 0.21. The loss tangent of the base layer at 30° C. was 0.10.

When adhesiveness of the base layer was 100, adhesiveness of the cap layer was 70, adhesiveness of the topping rubber of the carcass was 96, and adhesiveness of the fixing layer was 122.

A ratio (Y/X) of adhesiveness Y of the fixing layer to adhesiveness X of the cap layer was 1.74.

Comparative Example 1

Figure 5:
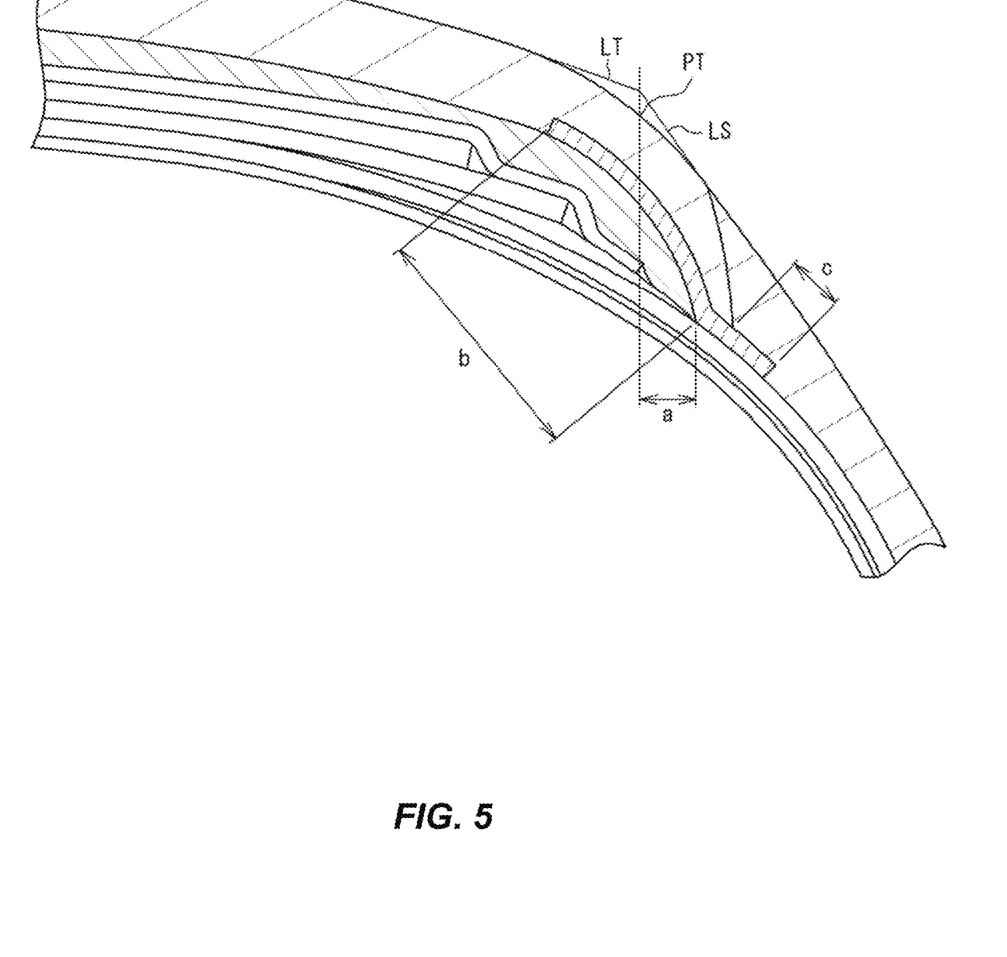
FIG. 5 is an enlarged cross-sectional view of a shoulder portion according to comparative example 1.

A tire of Comparative example 1 was obtained in the same manner as for Example 1 except that the shoulder portion had the structure shown in FIG. 5.

In Comparative example 1, the distance a was −5 mm, the distance b was −10 mm, and the distance c was 10 mm. The groove depth of the middle circumferential groove was 7.7 mm.

Comparative Example 2

A tire of Comparative example 2 was obtained in the same manner as for Comparative example 1 except that the tread was made thin such that the groove depth of the middle circumferential groove was 6.7 mm.

Examples 2 and 3

Tires of Examples 2 and 3 were each obtained in the same manner as for Example 1 except that the distance a was as indicated below in Table 1.

Example 4 and Comparative Example 3

Tires of Example 4 and Comparative example 3 were obtained in the same manner as for Example 1 except that the distances b were as indicated below in Tables 1 and 2.

Examples 5 to 7

Tires of Examples 5 to 7 were each obtained in the same manner as for Example 1 except that the distance c was as indicated below in Table 2.

Example 8 and Comparative Example 4

Tires of Example 8 and Comparative example 4 were each obtained in the same manner as for Example 1 except that adhesiveness of the fixing layer was changed and the ratio (Y/X) was as indicated below in Table 2.

[Occurrence of Separation]

100 green tires were produced, and whether or not air was left near the end of the tread was visually checked. The number of green tires in which air was not found to be left was counted and a proportion of good products was calculated. The results are indicated below as indexes in Tables 1 and 2 with the index of Comparative example 1 being 100. The greater the value is, the more effectively separation is prevented. In this evaluation, an index of not less than 90 is required as an allowable index by which frequency of occurrence of separation is evaluated as being low.

[Rolling Resistance Coefficient (RRC)]

A rolling resistance coefficient (RRC) was measured by using a rolling resistance testing machine when running with the test tire was performed on a drum at a speed of 80 km/h under the following conditions. The results are indicated below as indexes in Tables 1 and 2 with the index of Comparative example 1 being 100. The greater the value is, the lower rolling resistance of the tire is. In this evaluation, an index of not less than 90 is required as an allowable index by which increase of rolling resistance is evaluated as being inhibited.

Rim: 16×6.5J

Internal pressure: 210 kPa

Vertical load: 4.82 kN

[Limit Run]

The test tire was mounted on a rim (size=16×6.5J) and inflated with air, and the internal pressure of the tire was adjusted to 230 kPa. The tire was mounted to a test vehicle (passenger car (engine displacement=1300cc)). The test vehicle was caused to run at a limit speed on a dry road surface in a circuit course. A running distance was measured until separation occurred in the tread. The results are indicated below as indexes in Tables 1 and 2 with the index of Comparative example 1 being 100. The greater the value is, the better wear resistance ensured in limit run is.

[Overall Evaluation]

Overall evaluation was made based on the total of the values of the indexes obtained in the respective evaluations. The results are indicated below in the cells for "Overall" in Tables 1 and 2. The greater the value is, the better the evaluation is.

TABLE 1

|  | Comparative example 1 | Comparative example 2 | Example 2 | Example 1 | Example 3 | Comparative example 3 |
|---|---|---|---|---|---|---|
| Groove depth [mm] | 7.7 | 6.7 | 6.7 | 6.7 | 6.7 | 6.7 |
| a [mm] | −5 | −5 | 5 | 10 | 15 | 10 |
| b [mm] | −20 | −20 | 0 | 0 | 0 | −5 |

TABLE 1-continued

|  | Comparative example 1 | Comparative example 2 | Example 2 | Example 1 | Example 3 | Comparative example 3 |
|---|---|---|---|---|---|---|
| c [mm] | 10 | 10 | 5 | 5 | 5 | 5 |
| Y/X | 1.75 | 1.75 | 1.75 | 1.75 | 1.75 | 1.75 |
| Separation | 100 | 100 | 100 | 100 | 100 | 100 |
| RRC | 100 | 110 | 110 | 110 | 105 | 110 |
| Limit run | 100 | 90 | 110 | 120 | 120 | 100 |
| Overall | 300 | 300 | 320 | 330 | 325 | 310 |

TABLE 2

|  | Example 4 | Example 5 | Example 6 | Example 7 | Comparative example 4 | Example 8 |
|---|---|---|---|---|---|---|
| Groove depth [mm] | 6.7 | 6.7 | 6.7 | 6.7 | 6.7 | 6.7 |
| a [mm] | 10 | 10 | 10 | 10 | 10 | 10 |
| b [mm] | 5 | 0 | 0 | 0 | 0 | 0 |
| c [mm] | 5 | −5 | 10 | 15 | 5 | 5 |
| Y/X | 1.75 | 1.75 | 1.75 | 1.75 | 1.00 | 1.30 |
| Separation | 90 | 90 | 100 | 100 | 80 | 90 |
| RRC | 110 | 110 | 110 | 105 | 110 | 110 |
| Limit run | 120 | 120 | 120 | 120 | 120 | 120 |
| Overall | 320 | 320 | 330 | 325 | 310 | 320 |

As indicated in Tables 1 and 2, it was confirmed in the examples that enhancement of reducing rolling resistance while ensuring wear resistance in limit run. The evaluation results clearly indicate that the technique of the present disclosure is superior.

The technique capable of achieving enhancement of reducing rolling resistance while ensuring wear resistance in limit run as described above is applicable to various tires.

Preferably, in the tire, a distance from the reference end of the tread to the end of the base layer may be not less than 5 mm and not greater than 15 mm.

Preferably, in the tire, a distance from the first end of the fixing layer to the end of the base layer may be not greater than 5 mm.

Preferably, in the tire, the position of the first end of the fixing layer can coincide with the position of the end of the base layer in the axial direction.

Preferably, in the tire, a second end of the fixing layer can be in a zone from a position distant from an end of the cap layer over 5 mm in an inward direction to a position distant from the end over 10 mm in an outward direction.

Preferably, in the tire, a position of the second end of the fixing layer can coincide with a position of the end of the cap layer in the axial direction, or the second end of the fixing layer can be outward of the end of the cap layer in the axial direction, and a distance from the end of the cap layer to the second end of the fixing layer may be not greater than 5 mm.

Preferably, the tire can include a band disposed between the tread and the belt in the radial direction, and the band can include a helically wound band cord. The band can be a full band in which both ends oppose each other across an equator plane.

Preferably, the tire can include a pair of insulations between the carcass and the inner liner. A first end of each of the insulations can be inward of an end of the belt in the axial direction. A second end of each of the insulations can be outward of a corresponding one of the beads in the radial direction.

According to the present disclosure, the tire capable of achieving reduction of rolling resistance while ensuring wear resistance in limit run, can be obtained.

What is claimed is:
1. A tire comprising:
a tread;
a pair of sidewalls inward of the tread in a radial direction so as to be continuous with ends of the tread;
a pair of beads inward of the sidewalls in the radial direction;
a carcass inward of the tread and the pair of sidewalls so as to extend on and between one of the beads and another of the beads;
a belt between the tread and the carcass in the radial direction, the belt including multiple belt cords aligned with each other;
an inner liner inward of the carcass;
a pair of fixing layers spaced from each other in an axial direction; and
a band between the tread and the belt in the radial direction, the band comprising a helically wound band cord,
wherein the tread has a circumferential groove formed therein, and a groove depth of the circumferential groove being not greater than 7.0 mm,
wherein the tread comprises a cap layer and a base layer covered by the cap layer,
wherein a loss tangent of the cap layer at 30° ° C. is not greater than 0.30, and a loss tangent of the base layer at 30° C. is less than the loss tangent of the cap layer at 30° C.,
wherein the base layer is inward of a reference end of the tread in the axial direction,
wherein each said fixing layer is between the cap layer and the carcass in the radial direction,
wherein a first end of the fixing layer is outward of an end of the base layer in the axial direction, or a first position of the first end of the fixing layer coincides with a second position of the end of the base layer in the axial direction, wherein adhesiveness of each said fixing layer is higher than adhesiveness of the cap layer, wherein the band is a full band in which both ends oppose each other across an equator plane, wherein each of the fixing layers directly contacts the cap tread at a first side of the fixing layer and directly contacts the carcass at a second side of the fixing layer opposite the first side, wherein a distance from the reference end of the tread to the end of the base layer is not less than 5 mm and not greater than 15 mm, wherein a distance from the first end of the fixing layer to the end of the base layer is not greater than 5 mm, and wherein the first position of the first end of the fixing layer coincides with the second position of the end of the base layer in the axial direction.

2. The tire according to claim 1, wherein a first portion of each said fixing layer directly contacts the carcass at the second side of the fixing layer and a second portion of each said fixing layer does not directly contact the carcass at the second side of the fixing layer.

3. The tire according to claim 1, wherein each said fixing layer is formed of a rubber composition having a Mooney viscosity (ML 1+4) of not less than 45 and not greater than 80.

4. The tire according to claim 1, wherein a ratio of the adhesiveness of each said fixing layer to the adhesiveness of the cap layer is not less than 1.30.

5. A tire comprising:
a tread;
a pair of sidewalls inward of the tread in a radial direction so as to be continuous with ends of the tread;
a pair of beads inward of the sidewalls in the radial direction;
a carcass inward of the tread and the pair of sidewalls so as to extend on and between one of the beads and another of the beads,
a belt between the tread and the carcass in the radial direction, the belt including multiple belt cords aligned with each other;
an inner liner inward of the carcass; and
a pair of fixing layers spaced from each other in an axial direction,
wherein the tread has a circumferential groove formed therein, and a groove depth of the circumferential groove being not greater than 7.0 mm,
wherein the tread comprises a cap layer and a base layer covered by the cap layer,
wherein a loss tangent of the cap layer at 30° C. is not greater than 0.30, and a loss tangent of the base layer at 30° C. is less than the loss tangent of the cap layer at 30° ° C.,
wherein the base layer is inward of a reference end of the tread in the axial direction,
wherein each said fixing layer is between the cap layer and the carcass in the radial direction,
wherein a first end of the fixing layer is outward of an end of the base layer in the axial direction, or a first position of the first end of the fixing layer coincides with a second position of the end of the base layer in the axial direction, wherein adhesiveness of each said fixing layer is higher than adhesiveness of the cap layer, wherein a distance from the reference end of the tread to the end of the base layer is not less than 5 mm and not greater than 15 mm, wherein a distance from the first end of the fixing layer to the end of the base layer is not greater than 5 mm, and wherein the first position of the first end of the fixing layer coincides with the second position of the end of the base layer in the axial direction.

6. The tire according to claim 5, comprising a band between the tread and the belt in the radial direction, the band comprising a helically wound band cord, wherein the band is a full band in which both ends oppose each other across an equator plane.

7. The tire according to claim 5, comprising a pair of insulations between the carcass and the inner liner, wherein a first end of each of the insulations is inward of an end of the belt in the axial direction, and wherein a second end of each of the insulations is outward of a corresponding one of the beads in the radial direction.

8. The tire according to claim 5, wherein each said fixing layer is formed of a rubber composition having a Mooney viscosity (ML 1+4) of not less than 45 and not greater than 80.

9. The tire according to claim 5, wherein each said fixing layer is non-planar in shape in a side sectional view of the tire.

10. The tire according to claim 5, wherein a second end of the fixing layer is in a zone from a third position distant from an end of the cap layer over 5 mm in an inward direction to a fourth position distant from the end over 10 mm in an outward direction.

11. The tire according to claim 10, wherein a position of the second end of the fixing layer coincides with a position of the end of the cap layer in the axial direction, or the second end of the fixing layer is disposed outwardly of the end of the cap layer in the axial direction, and a distance from the end of the cap layer to the second end of the fixing layer is not greater than 5 mm.

12. The tire according to claim 5, wherein each of the fixing layers directly contacts the cap tread at a first side of the fixing layer and directly contacts the carcass at a second side of the fixing layer opposite the first side.

13. The tire according to claim 12, wherein a first portion of each said fixing layer directly contacts the carcass at the second side of the fixing layer and a second portion of each said fixing layer does not directly contact the carcass at the second side of the fixing layer.

14. The tire according to claim 5, wherein a ratio of the adhesiveness of each said fixing layer to the adhesiveness of the cap layer is not less than 1.30.

15. The tire according to claim 14, wherein the ratio of the adhesiveness of each said fixing layer to the adhesiveness of the cap layer is not less than 1.50.

16. The tire according to claim 5, wherein a thickness of each said fixing layer is constant.

17. The tire according to claim 16, wherein the thickness of each said fixing layer is not less than 0.5 mm and not greater than 2.0 mm.

* * * * *